United States Patent [19]

Cook et al.

[11] 4,333,175

[45] Jun. 1, 1982

[54] TELEPHONE SYSTEM USING PULSE CODE MODULATED SUBSCRIBER LINES

[75] Inventors: R. Gordon Cook, Canandaigua, N.Y.; Todd V. Townsend, Reno, Nev.

[73] Assignee: Lynch Communication Systems, Inc., Reno, Nev.

[21] Appl. No.: 148,248

[22] Filed: May 9, 1980

[51] Int. Cl.³ ............................................. H04J 3/08
[52] U.S. Cl. ........................................ 370/56; 370/87
[58] Field of Search ............. 179/18 FC, 41 R, 41 A; 370/56, 84, 85, 86, 87, 89, 90, 94

[56] References Cited

U.S. PATENT DOCUMENTS

| | | | |
|---|---|---|---|
| Re. 28,958 | 9/1976 | Zafiropulo et al. | 370/87 |
| 3,796,835 | 3/1974 | Closs et al. | 370/94 |
| 4,071,706 | 1/1978 | Warren | 370/94 |
| 4,229,815 | 10/1980 | Cummiskey | 370/85 |
| 4,251,880 | 2/1981 | Baugh et al. | 370/94 |

Primary Examiner—Benedict V. Safourek
Attorney, Agent, or Firm—Harry G. Weissenberger

[57] ABSTRACT

In an all-digital telephone system for communication between a central office and widely scattered subscriber locations, means are disclosed for carrying digital service from the central office to various distribution locations over T1-type equipment and from the distribution locations to subscriber locations over ordinary two-wire lines using time-shared bidirectional pulse code modulation.

A salient feature of the system is the provision of "smart repeater" means which permit unidirectional or bidirectional access between any digital subscriber line and any channel of the T1 line under the control of the central office. Provisions are also made in the system for the transmission of slow-speed signals suitable for the remote reading information from sensing devices at the subscriber locations and for the remote operation of suitable devices at the subscriber locations.

20 Claims, 16 Drawing Figures

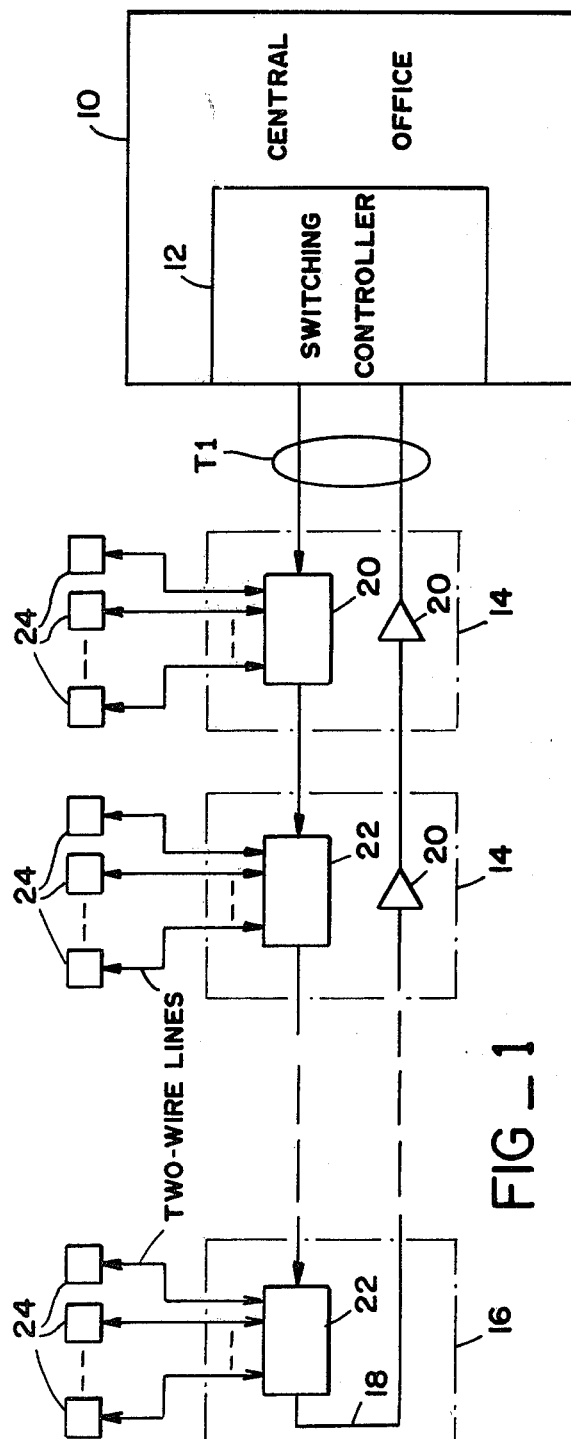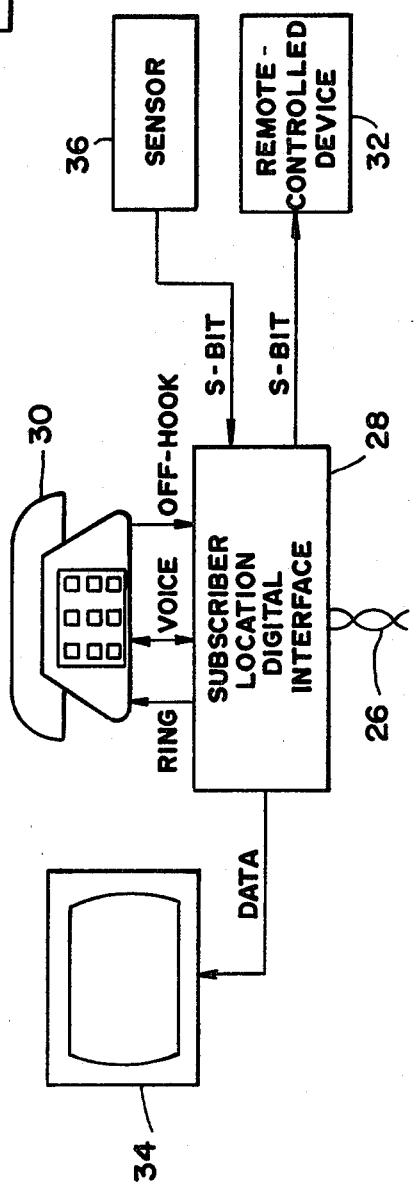

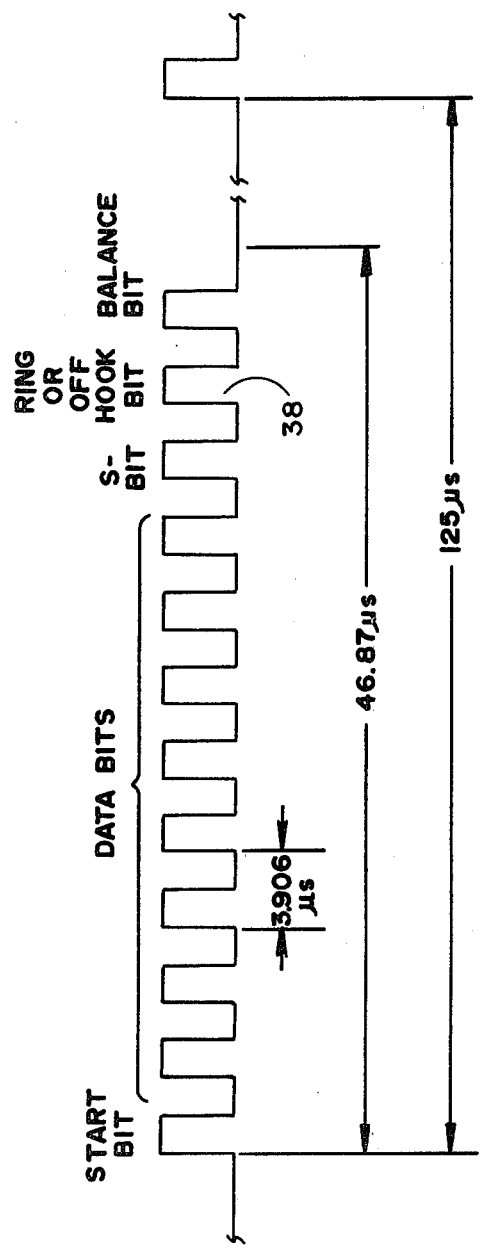
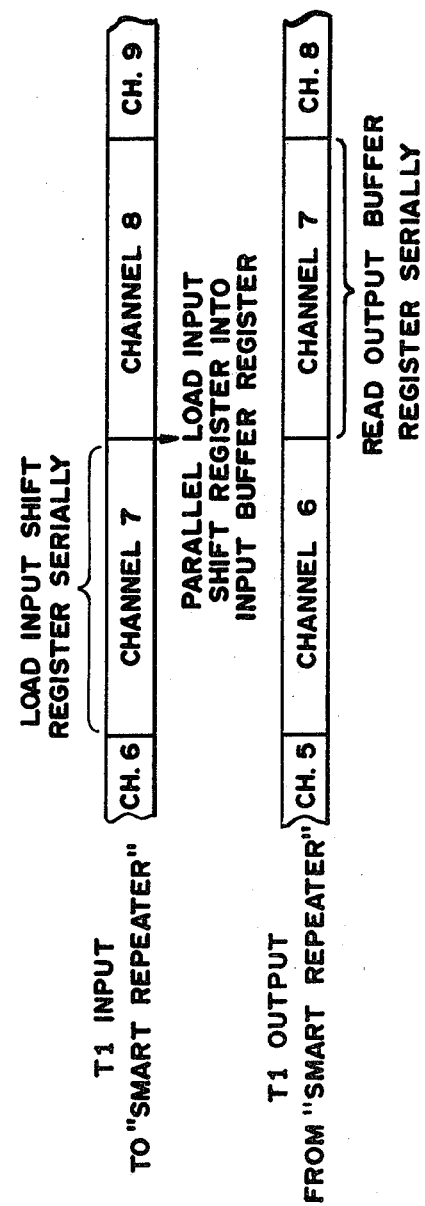

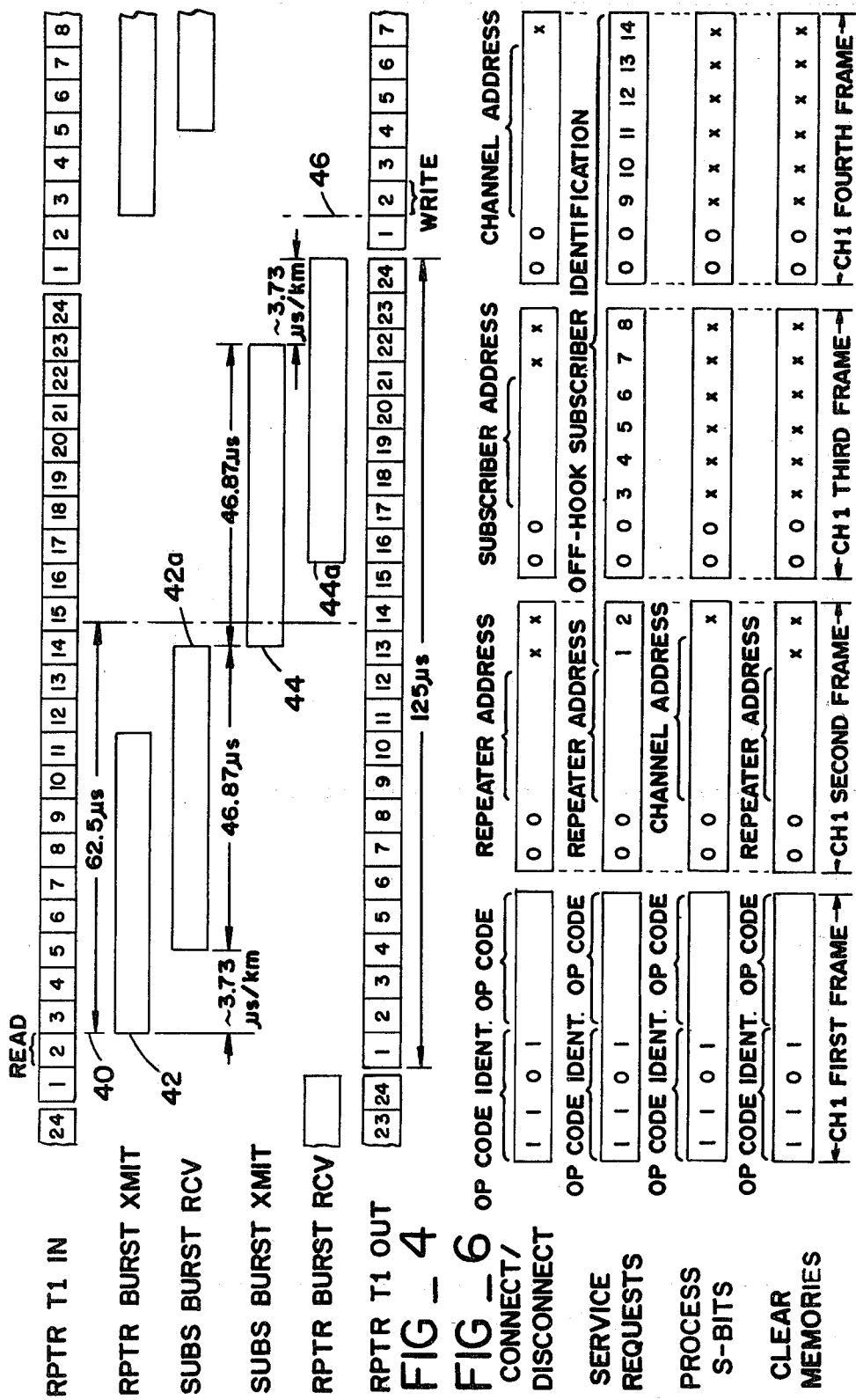

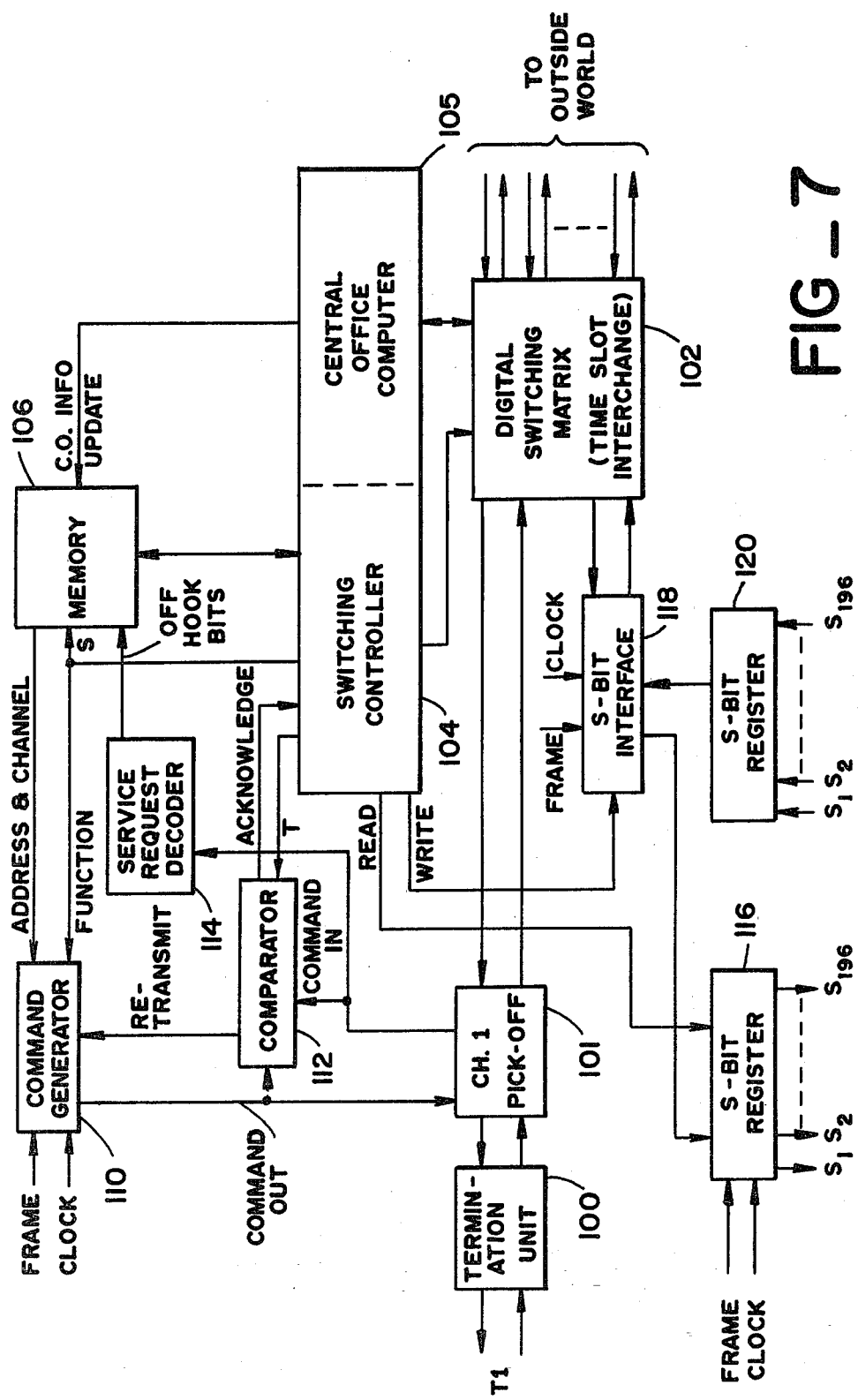
FIG_7

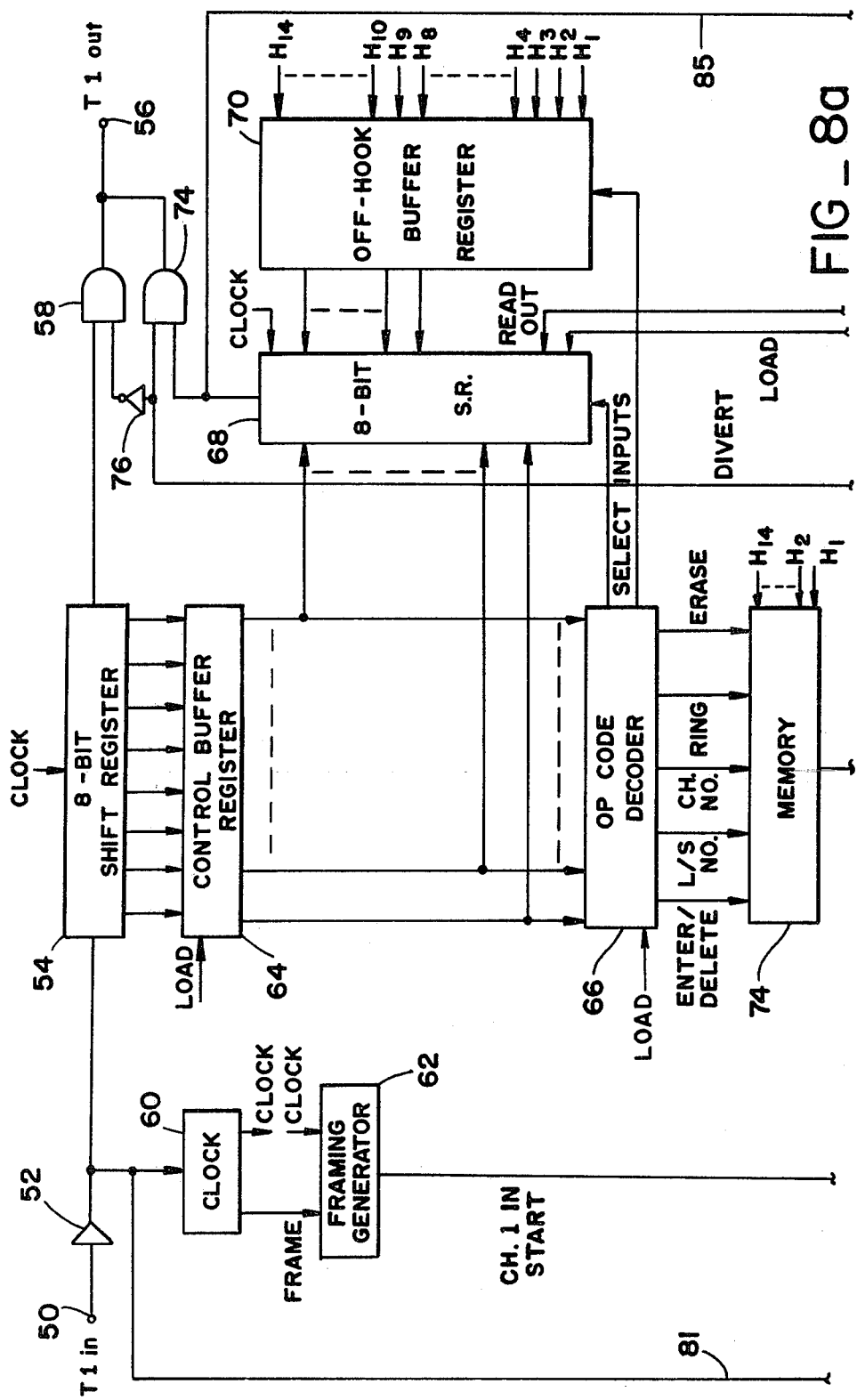

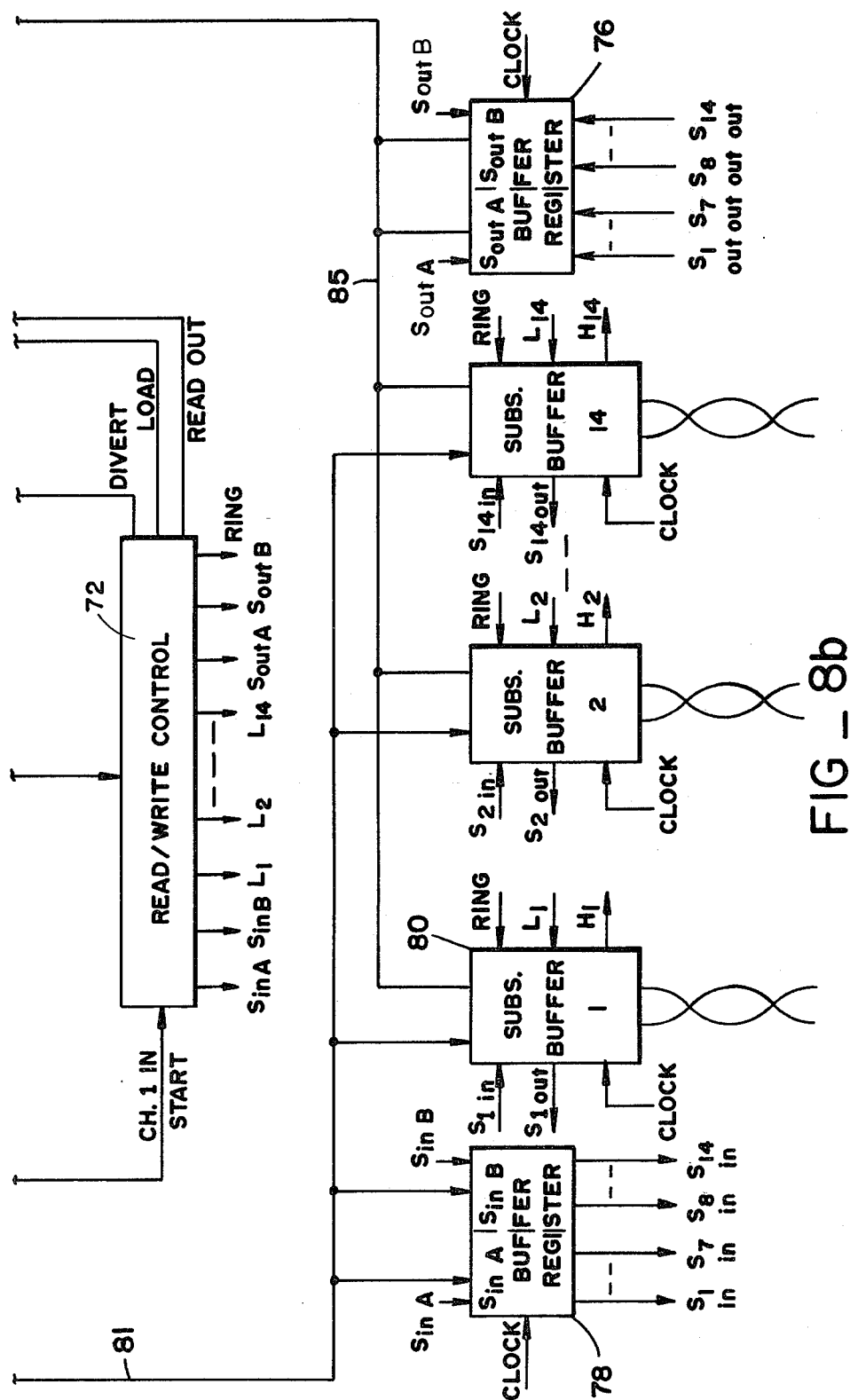
FIG_8b

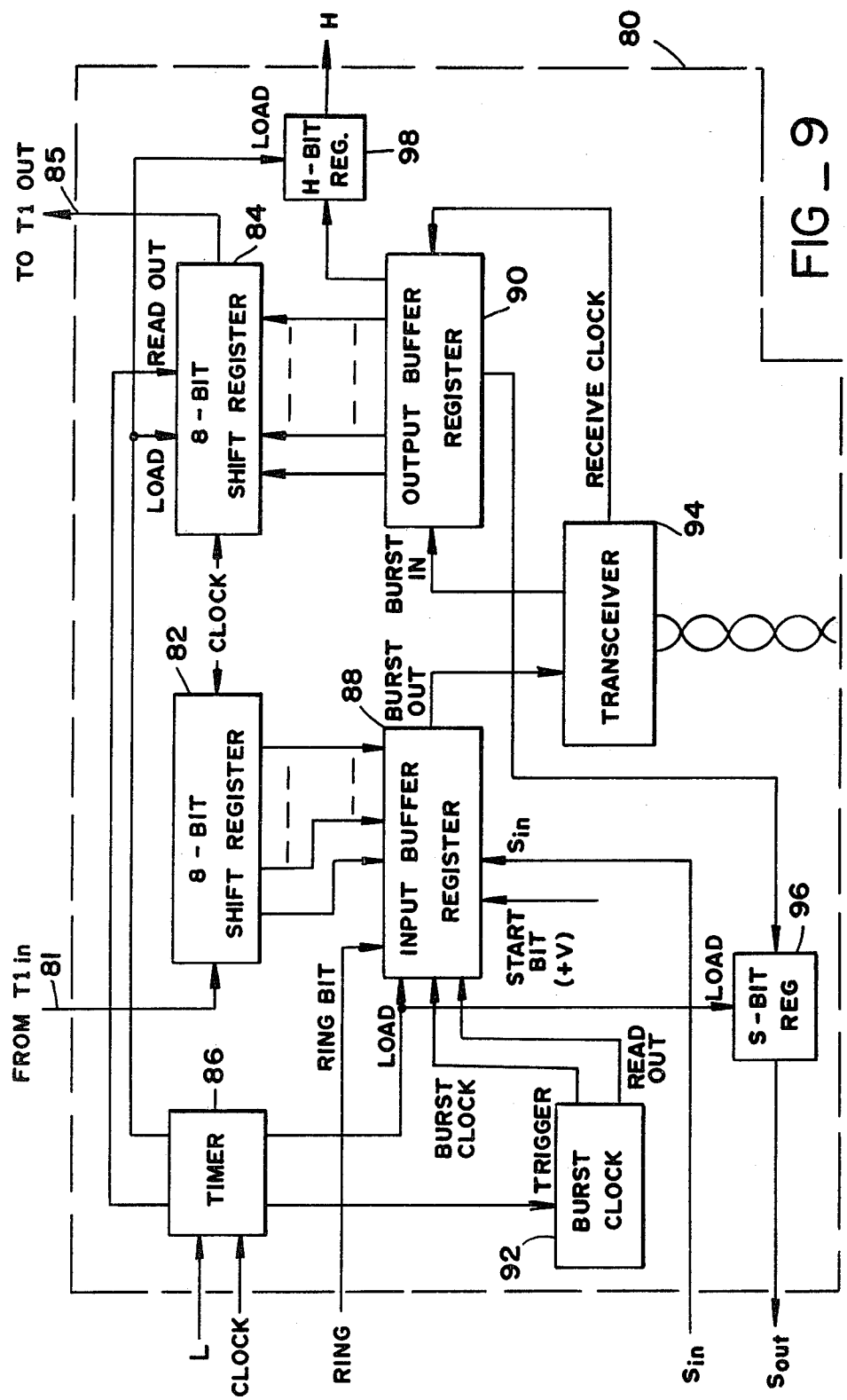
FIG_9

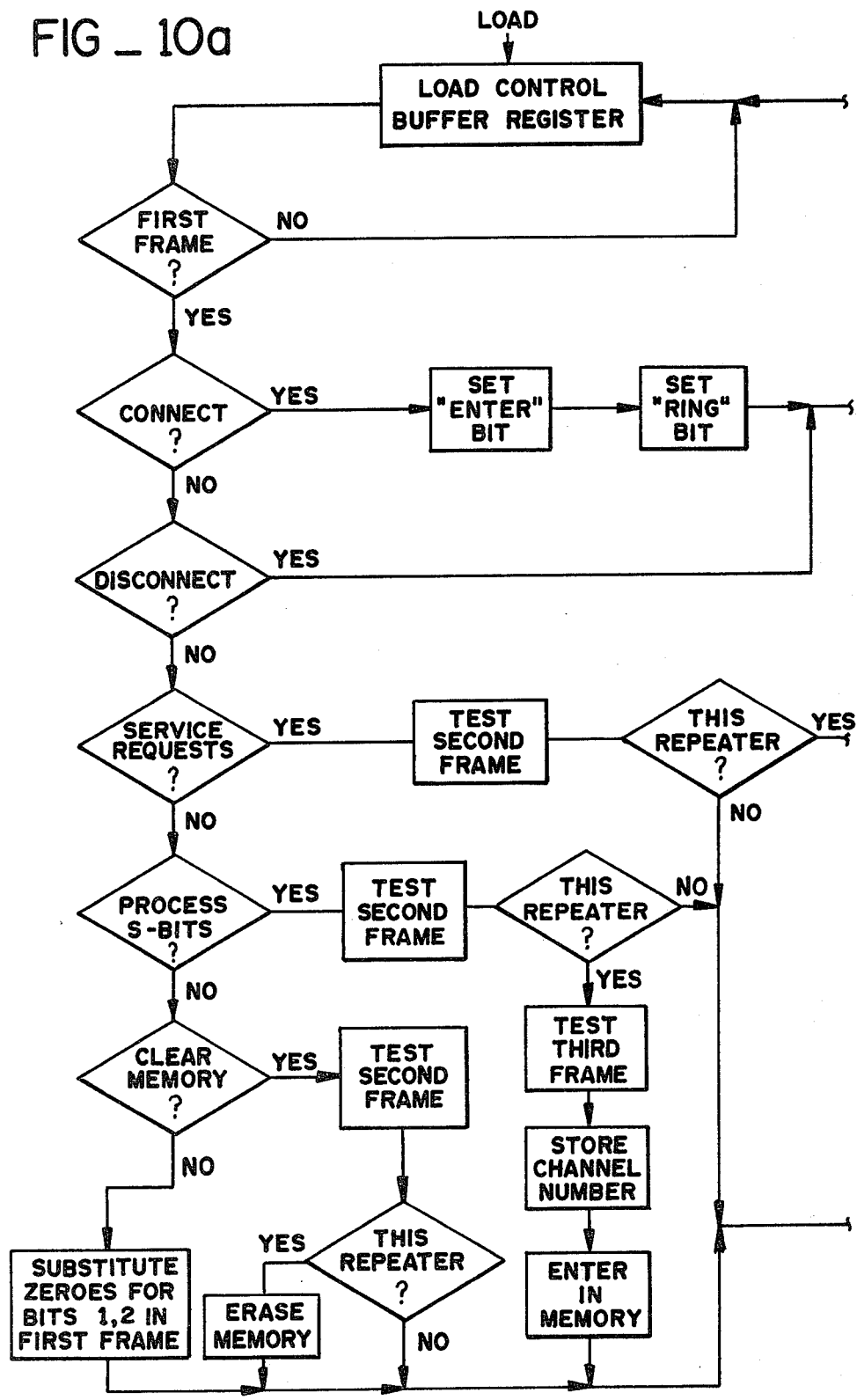
FIG_10a

FIG_10b
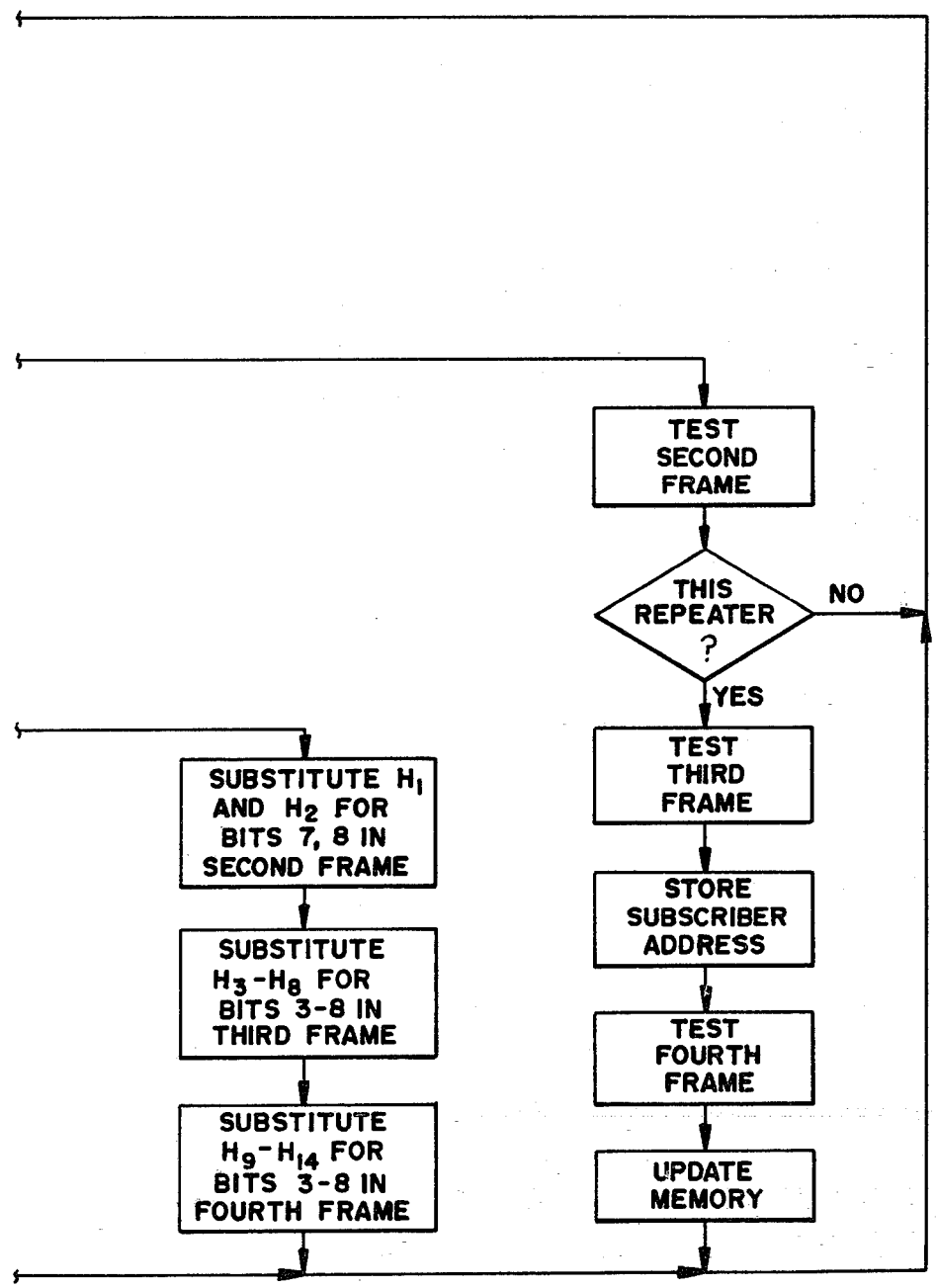

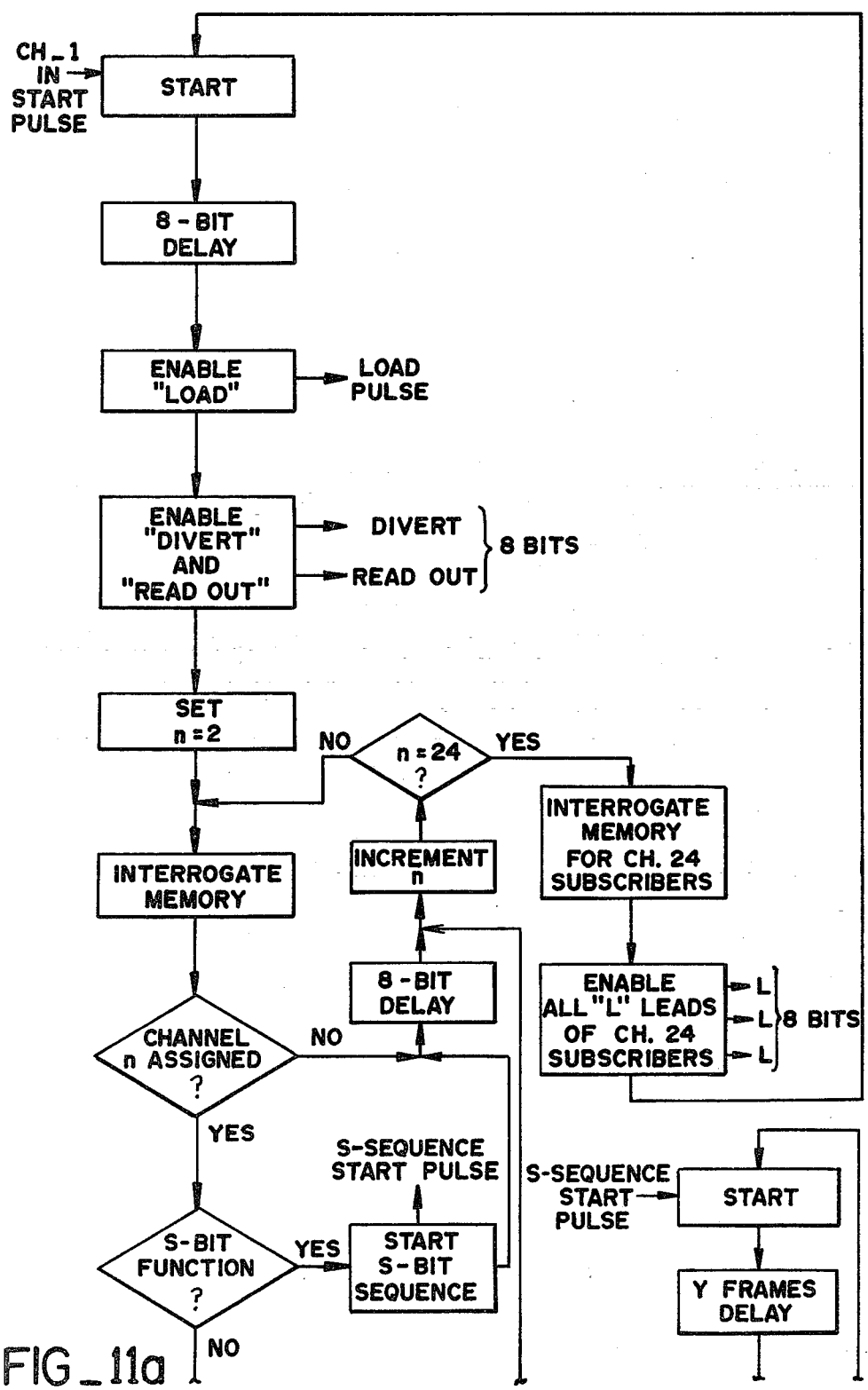
FIG_11a

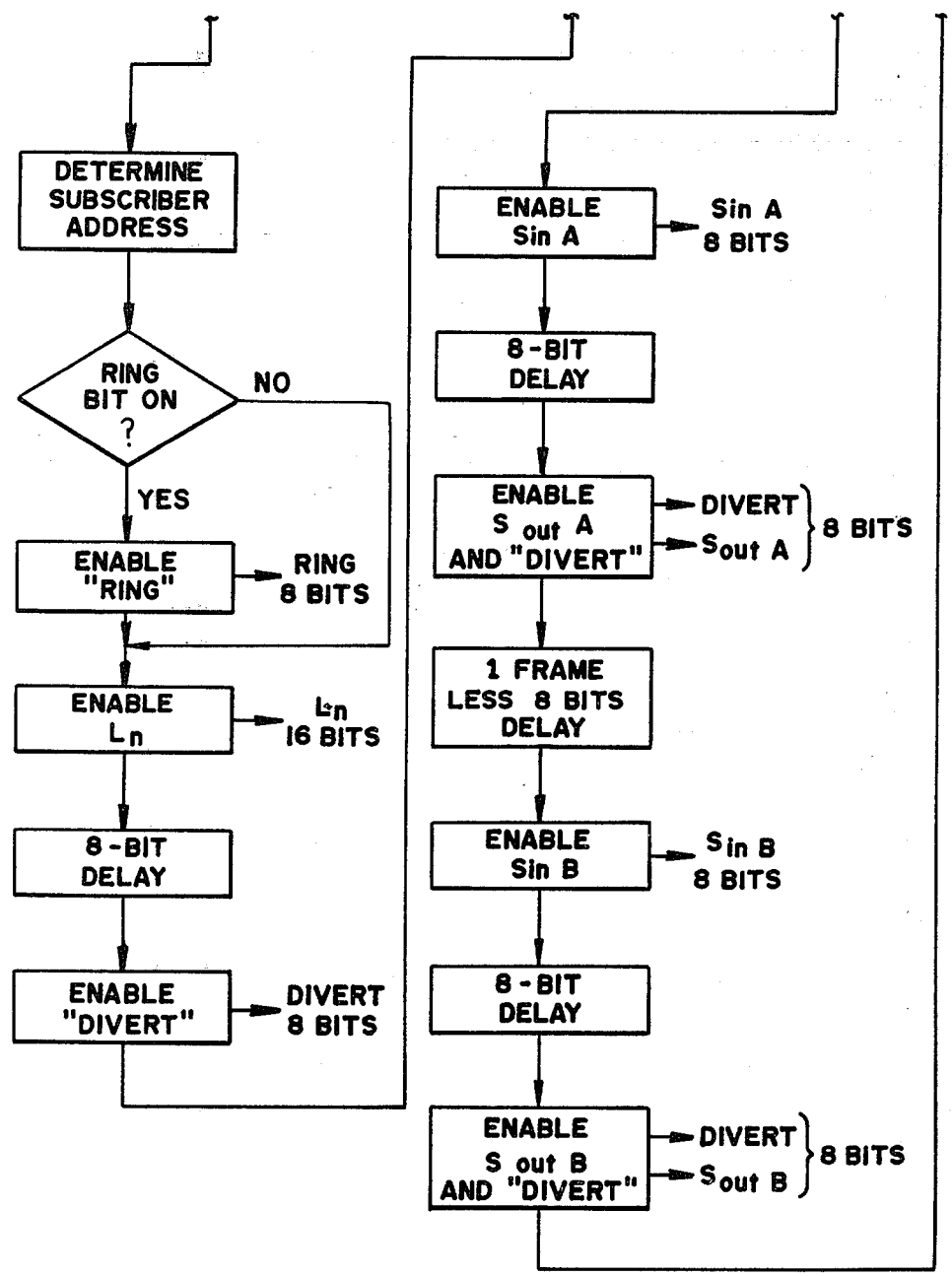
FIG _ 11b

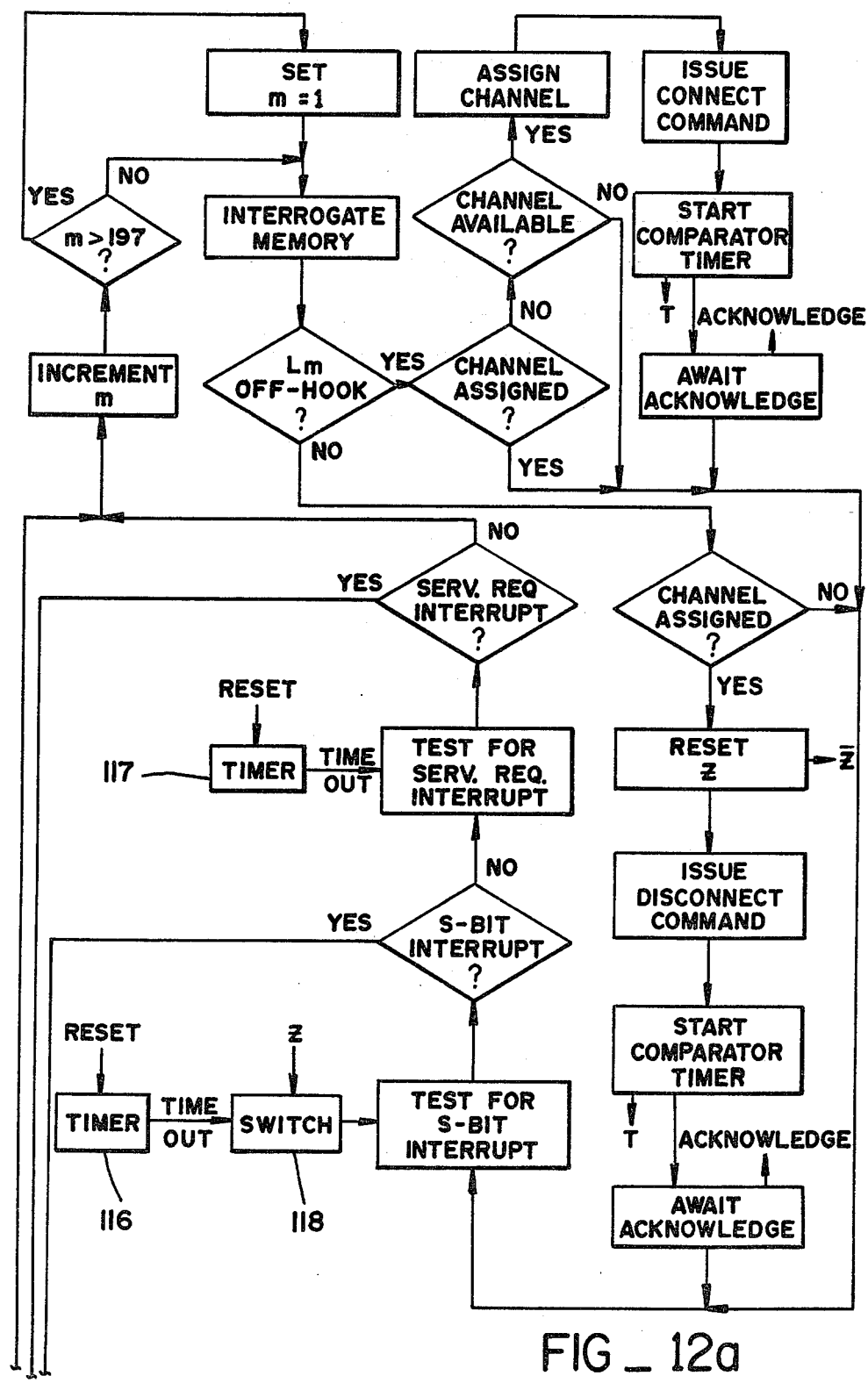
FIG_12a

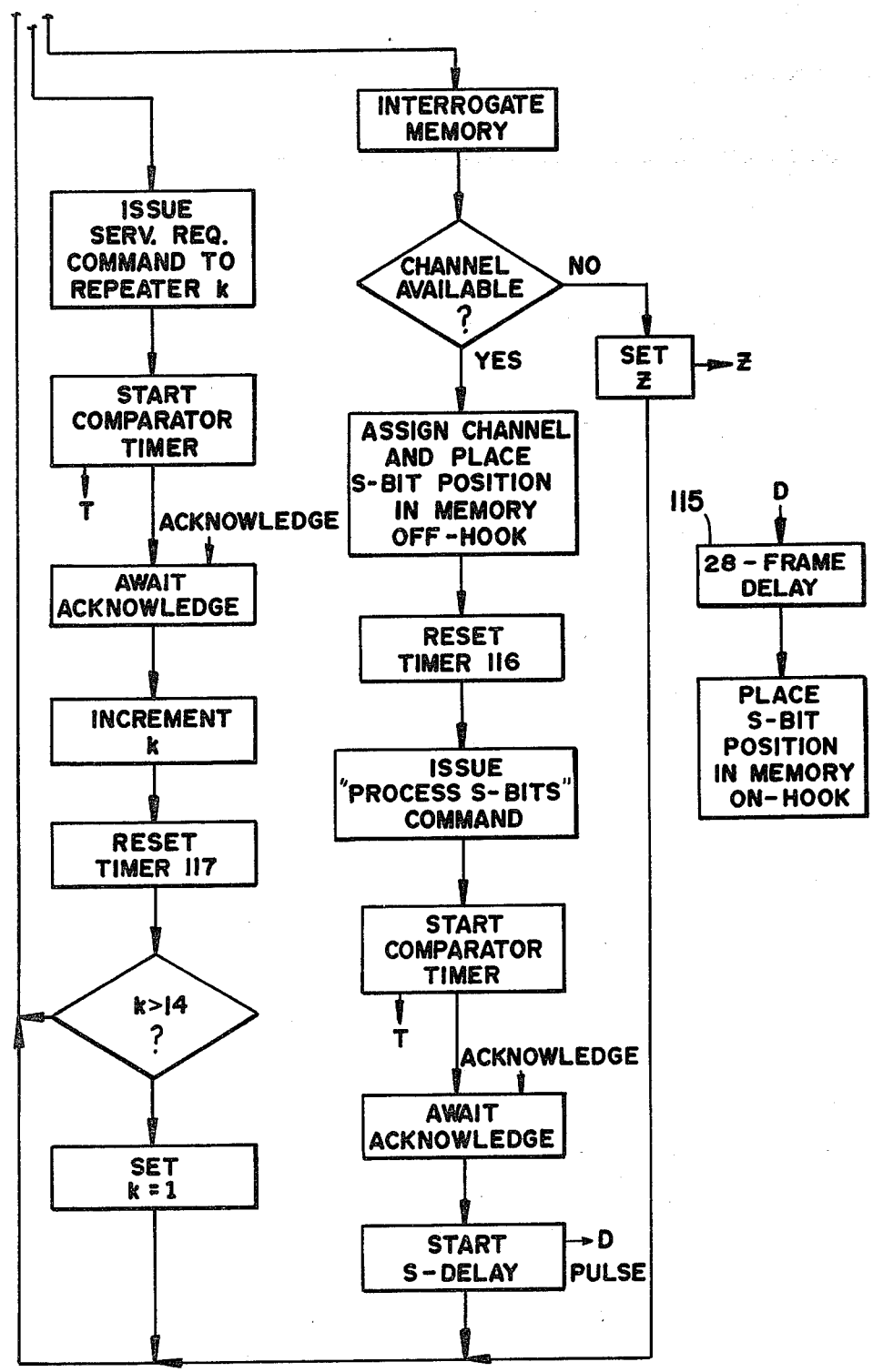
FIG_12b

TELEPHONE SYSTEM USING PULSE CODE MODULATED SUBSCRIBER LINES

BACKGROUND OF THE INVENTION

This invention relates to telephone systems in which a looped pulse-code modulated (PCM) trunk line extends outwardly from a central office, and in which one or more subscribers are connected to the trunk line at repeater locations.

In the prior art, it has been conventional to extend a PCM trunk line from a central office to a remote concentrator to which individual subscribers at the remote location are connected by two-wire pairs. With this system, a PCM trunk line (usually thought of as a T1 line) was able to serve only one remote location. In applications where subscribers are scattered along a T1 line, it has long been felt desirable to provide some kind of system in which the subscribers can access the T1 line directly at any repeater location.

Attempts to provide such apparatus have been made by various designers. For example, such techniques have been described in the following documents:

(1) "A Proposal for the Introduction of Digital Techniques into Local Distribution" by Ithell & Jones, *Proceedings of the* 1978 *International Zurich Seminar on Digital Communications,* IEEE Cat. No. 78 CH 1325-0 ASST, pp. 75.1-6;

(2) "An Integrated Digital Subscriber Multiplexing and Switching System for Mixed Circuit and Packet Communication" by Pederson, *Conference Record of the* 1978 *International Symposium on Subscriber Loops and Services,* IEEE Cat. No. 78 CH 1279-9 COM, pp. 156-160;

(3) "An Approach to Multiservice Subscriber Loop System Using Packetized Voice/Data Terminals" by Tsuda, Yatsuboshi, Yamauchi and Hattori; *Conference Record of the* 1978 *International Symposium on Subscriber Loops and Services,* IEEE Cat. No. 78 CH 1279-9 COM, pp. 161-165;

None of the foregoing publications describe, however, a simple, centrally controlled system in which any subscriber connected to any repeater along the line can access any free channel on the line or be accessed by any channel on the line, and which is capable of operating in an all-digital mode suitable for use with digital telephones and high-speed data sets at the subscriber locations.

SUMMARY OF THE INVENTION

The present invention provides apparatus including "smart repeaters" in which, under the control of the central office, any subscriber connected to any repeater along a looped T1-type trunk line can access, or be accessed by, any channel of the T1 line in an all-digital mode.

Commands issued by the central office over a dedicated signalling channel of the T1 line operate control circuitry in the "smart repeater" which identifies the channels to be connected to subscribers and connects them to appropriate subscriber buffers. Any channels not selected for connection to a subscriber are simply routed through an 8-bit shift register (to produce a synchronization delay) from which their contents are transmitted unchanged into the outgoing T1 line. Consequently, as far as any non-selected channels are concerned, the "smart repeater" is essentially transparent.

The input from the T1 line is also applied to an input bus within the "smart repeater" to which a plurality of subscriber buffers, each containing a channel-to-burst format converter, are connected. The individual buffers are under the timing control of the control circuitry, so that each buffer picks the channel relating to its own subscriber off the input bus.

Signals from the subscribers which are to be returned to the central office are converted back from burst format into T1 channel format by the subscriber buffers, and the resulting T1-type information is applied (eight bit intervals later than the corresponding incoming T1 signal) to an output bus with proper timing as determined by the control circuitry. The informational contents of the output bus are then substituted for the delayed channel information in used channels (but not in unused channels) to form the output signal to the next repeater.

It will be seen that at the output of the "smart repeater," the information coming from the central office has thus been replaced with subscriber-originated information in those channels of the T1 line which have been selected by the central office unit for connection to a subscriber.

The control circuitry of the "smart repeater" not only receives and interprets commands issued by the central office, but also originates service requests to the central office under the control of the off-hook condition signals from the subscribers. These service requests are preferably transmitted back to the central office by appropriately modifying a "return service requests" command originated by the central office and transmitted to all repeaters and back to the central office over the signalling channel of the T1 line.

The system of this invention has the capability of transmitting slow-speed surveillance or remote control signals in either direction between the subscriber and the central office. The system stores the signals (herein referred to as S-bits) at both the repeaters and the central office, and periodically transmits them over any channel which happens to be available at that time.

Inasmuch as the system has the capability of connecting any subscriber to any channel of the T1 line, it is possible to provide a channel dedicated to the transmission of information of general interest such as, e.g., stock market reports. The system has the ability to connect subscribers to this channel in a listen-only mode, so that information on this channel can be displayed on appropriate reproduction equipment at any subscriber location on demand.

BRIEF DESCRIPTION OF THE DRAWINGS

FIG. 1 is a clock diagram illustrating the interconnection of the various major components of the system of this invention;

FIG. 2 is a schematic diagram illustrating the interrelation of the equipment located at a typical subscriber location in the system;

FIG. 3 is a time-amplitude diagram illustrating the digital signal burst used for communication by the "smart repeater" and a subscriber location;

FIG. 4 is a timing diagram illustrating the time relationship of various signals within the system to each other;

FIG. 5 is an enlarged section of the timing diagram of FIG. 4 illustrating the relative timing of the input and output channels of the "smart repeater" of this invention;

FIG. 6 is a timing diagram illustrating one possible set of commands suitable for the control of the system of this invention;

FIG. 7 is a block diagram of those portions of the central office which are relevant to the operation of the system of this invention;

FIGS. 8a and 8b are block diagrams of a "smart repeater;"

FIG. 9 is a block diagram of a subscriber buffer;

FIGS. 10a and 10b are program flow charts of the command decoder of FIGS. 8a and 8b;

FIGS. 11a and 11b are program flow charts of the read/write control of FIGS. 8a and 8b; and FIGS. 12a and 12b are program flow charts of the switching controller of FIG. 7.

DETAILED DESCRIPTION OF THE INVENTION

Referring now to the individual figures of the drawing, FIG. 1 shows the overall layout of the system of this invention. An all-digital central office 10 of generally conventional construction has an operating section 12 (illustrated in more detail in FIG. 7) which operates the system of this invention in a manner hereafter described. A PCM multi-channel multiplexed carrier (usually a T1-type telephone line) extends outwardly from the central office 10 through a series of distribution locations 14 to a final distribution location 16 where it is looped at 18 for the return to the central office 10. In practice, the distribution locations 14 would normally coincide with the repeater locations of a conventional T1 line.

On the return run, the T1 line is repeatered by a conventional repeater 20 at each distribution or repeater location 14. On the outbound run, however, the T1 line is repeatered by "smart repeaters" 22 which form the subject of this invention and which contain subscriber-connecting means having the ability to connect any desired subscriber location or group of subscriber locations 24 to any channel of the T1 line in such a way that the outgoing signal from the subscriber is substituted for the incoming signal to the subscriber on the selected channel of the T1 line at the distribution location to which the subscriber location is connected. The connection of specific subscriber locations or groups of subscriber locations to any given channel of the T1 line is accomplished by control circuitry within the "smart repeater" 22 under the control of the central office 10.

As a matter of physical layout, one or more "smart repeaters" may be inserted in the T1 line at the central office 10 to serve nearby subscribers which are connected to the central office by twisted pairs.

FIG. 2 illustrates in somewhat greater detail the type of service which is contemplated by the invention at the subscriber locations 24. Each subscriber location 24 is connected to its distribution location 14 or 16 by a conventional twisted pair 26. In accordance with known technology, the twenty-four channel D3 pulse format of the T1 line is converted into a PCM burst format which is transmitted on a time-shared basis from the distribution location 14 or 16 to the subscriber location 24 and back from the subscriber location 24 to the distribution location 14 or 16 over the same pair. The subscriber location interface unit 28 receives the incoming bursts, decodes them, and provides output signals to operate the ringing circuit of the subscriber set 30, the remote-controlled device 32, and the data display set 34, in addition to conveying voice signals to the subscriber set 30.

The subscriber location interface unit 28 also receives, in addition to voice signals from the subscriber set 30, an input from a sensor 36 and an off-hook signal from subscriber set 30, all of which it encodes into bursts for transmission over the twisted pair 26. The manner in which the subscriber location interface unit 28 accomplishes these functions is conventional and forms no part of this invention. As a matter of reference, PCM subscriber systems of this general type are disclosed in the article "Digital Two-Wire Connection Providing Office Subscribers with Special Data and New Tele-Information Services" by Kaiser, Hagmeyer (Conference Record of the 1978 International Symposium on Subscriber Loops and Services, IEEE Cat. No. 78 CH 1279-9 COM, pp. 126–130).

For a better understanding of the operation of the "smart repeater" 22, it is useful at this point to consider the parameters involved in the two-way burst communication over the twisted pair 26. FIG. 2 shows the typical makeup of an outgoing burst in the direction from the subscriber location 24 to the distribution location 14 or 16. Although displaced in time, the incoming burst from the distribution location 14 or 16 to the subscriber location 24 would be identical except that the off-hook bit 38 is replaced by a ring bit. It will be noted that the overall length of the burst is somewhat less than 50 $\mu$s, whereas the interval between the start of successive bursts is 125 $\mu$s. The latter interval corresponds to the interval between the start of successive frames of a given channel in the standard D3 format of the T1 line.

Referring now to FIG. 4, the interrelationship between the timing of the T1 line and the bursts on the twisted pair 26 can be seen. In FIG. 4, the top line shows the sequence of channels on the T1 line incoming to the distribution location 14 or 16. Digressing a moment to the diagram of the "smart repeater" shown in FIG. 8, it will be noted at the top of that figure that an 8-bit shift register is interposed between the incoming T1 line and the outgoing T1 line. Consequently, the T1 line channels outgoing from the distribution location 14 or 16 are displaced in time from those of the incoming T1 line by one channel interval, as illustrated in the bottom line of FIG. 4.

Let us now suppose that an incoming signal to be transmitted to a certain subscriber appears on channel 2 of the T1 line. As soon as all bits of channel 2 have been received by the "smart repeater" 22 (time point 40 in FIG. 4), a burst 42 containing the information read from channel 2 can be transmitted to the subscriber. Inasmuch as there is a certain transmission delay D (about 3.7 $\mu$s/km) along the twisted pair, the burst 42 is received at the subscriber location 24 a fixed time interval later than it is transmitted, the length of this interval depending on the distance between the subscriber location 24 and the distribution location 14 or 16. The burst received at the subscriber location 24 is identified in FIG. 2 by the reference numeral 42a.

Immediately upon receipt of the last bit of burst 42a, the subscriber location interface unit 28 transmits a burst 44 which arrives at the distribution location 14 or 16 after another time delay D as illustrated at 44a in FIG. 4. It will be noted that as long as the last bit of the outgoing burst 44a is received at the distribution location 14 or 16 before the deadline 46, all the information in the received burst will be available at the distribution location 14 or 16 in time to be substituted for the incoming information on channel 2 of the next frame of the outgoing T1 signal. The distance between the distribution location 14 or 16 and the subscriber location 24 is consequently limited to about 4 km by the fact that the time elapsed between the transmission of the first bit of any given burst and the receipt of the last bit of that burst cannot exceed 62.5 μs if the D3 format is used on the T1 line.

FIG. 8 illustrates the functioning of the "smart repeater" 22. The incoming signal from the T1 line enters the "smart repeater" 22 at 50 and is amplified and shaped by repeater amplifier 52. Inasmuch as the repeater amplifier 52 plays no part in the operation of the subscriber-connecting circuitry which constitutes the rest of the "smart repeater" 22, it can be physically located at a different location than the subscriber-connecting circuitry, or it can even be omitted entirely, as for example in a "smart repeater" 22 located at the central office 10 to serve subscribers in the vicinity of the central office 10.

In the absence of any utilization of the incoming signal by the "smart repeater" 22, the incoming signal on the T1 line is delayed by 8 bits in shift register 54, and is then conveyed to output 56 through AND gate 58.

Clock 60 derives clocking and framing information from the incoming pulse train of the T1 line. The information produced by clock 60 is used to drive framing generator 62, which produces a pulse indicative of the start of channel 1 of an incoming frame. It will be remembered that the output signal on the T1 line has the same timing as the input signal on that line but with an 8-bit (i.e. one-channel) delay.

At the end of channel 1 on the incoming T1 line, the shift register 54 contains the eight bits of the channel 1 signal. At that moment, the LOAD pulse from read-write control 72 parallel-loads the contents of shift register 54 into the control buffer register 64. Simultaneously, it applies the same information from the parallel outputs of buffer register 64 to the command decoder 66 and the switchable eight-bit output shift register 68. The output register 68 is switchable under the control of command decoder 66 and read-write control 72 to load any given one of its eight bits from either the control buffer register 64 or from the off-hook buffer register 70, for reasons hereafter explained.

Simultaneously with the loading of control buffer register 64, the read-write control 72 enables the READ OUT input of output register 68 for about 5.18 μs (i.e. one channel interval of the D3 format) to serially read out shift register 68. Simultaneously, it enables the DIVERT line for one channel interval. This enables AND gate 74 and disables AND gate 58 through inverter 76, so that the serial output of shift register 68 is substituted for the input information from the T1 line in the delayed channel 1 signal at the output terminal 56.

The command decoder 66 is essentially a microprocessor which interprets the commands issued over channel 1 of the T1 line by the central office 10. It may take any convenient form dictated by the practical exigencies of the command formats used by any particular circuit designer or programmer. As a matter of illustration only, one posible form of command decoder 66 is shown in FIG. 10.

FIG. 6 illustrates one possible type of command format which may be used in connection with the system of this invention. A command may consist typically of a four-frame sequence of eight bits each on channel 1 of the T1 line. The start of the first frame of each four-frame sequence may be identified by an op code identifier such as, e.g., 1101. The next four digits of the first frame may contain a binary op code which identifies the command as a connect, disconnect, return service requests, process S-bits, or clear memories command. Other op codes may be used in the operation of the system for testing and other supervisory purposes which are not material to this invention.

The remaining three frames of each command contain information relevant to the operation identified by the op code. For example, in a connect or disconnect command, the second frame may contain the address of the distribution location to which the subscriber is connected, the third frame may contain the address of the subscriber location, and the fourth frame may contain the address of the channel to or from which the subscriber is to be connected or disconnected.

The system of this invention is described herein, for convenience, in terms of a single twenty-four channel T1 line connecting a maximum of fourteen distribution locations each serving a maximum of fourteen subscribers, or a maximum grand total of 196 subscribers. Other numerical arrangements are of course possible.

In the case of a "return service requests" command, the second frame may contain the distribution location address and the first two of fourteen bits, each corresponding to one of the subscribers connected to that distribution location, which are preferably made "1" when the subscriber is off-hook and "0" when the subscriber is on-hook.

In the case of a "process S-bits" command, the only information needed is the address of the channel on which the S-bits are to be transmitted, and this information can be contained in the second frame. The third and fourth frames contain no information and may, with appropriate program modifications, be omitted.

Likewise, a "clear memories" command only needs the second frame for the address of the distribution location whose memory is to be cleared. It will be understood that an appropriate address such as, e.g., 11111111, may be provided to which all "smart repeaters" 22 will respond.

In order to avoid confusion between frames, the first two bits of each frame after the first may be set to zero so that they cannot be confused with the first frame of the sequence. As explained hereinbelow, the central office 10 may test the returning command to see if the first frame is identical to what had been transmitted. Consequently, by zeroing the first two bits of the first frame, a "smart repeater" unable to identify an op code may defeat the acknowledgement of the command and thereby cause its retransmission by the central office.

As illustrated in FIG. 10, the command decoder 66 may be programmed to locate the beginning of a four-frame command sequence (assuming the command format of FIG. 6 is used) to determine what the nature of the command is, whether the command is addressed to it, and to which of its subscribers it relates. If the command is a connection or disconnection command, the program stores the relevant data from successive frames of the command sequence. When the data is complete, it enters into (or deletes from) the memory 74 the subscriber number and channel number involved, and whether or not the subscriber is to be rung (in case of a call originating from the central office 10).

If the command is a "return service requests" command, the decoder program switches the input selection circuitry of shift register 68 and off-hook buffer register 70 so as to substitute, in successive frames, off-hook signals $H_1$ and $H_2$, $H_3$ through $H_8$, and $H_9$ through $H_{14}$ for the appropriate bits of the incoming channel 1 signal as shown in FIG. 6.

When a "process S-bits" command is received, the decoder 66 enters into the memory 74 the number of the channel assigned by the central office 10 for the S-bit transmission, as well as the information that the S-out and S-in buffer registers 76, 78 are to be connected to that channel.

A "clear-memory" command causes the decoder 66 to erase the memory when the system goes back on-line after a service interruption.

If the decoder 66 is unable to identify the command, it switches the parallel inputs of output register 68 to substitute zeroes for the initial ones of the first frame of the command. As hereinafter explained in connection with FIG. 7, this causes the central office 10 to retransmit the command.

The read-write control 72 is also preferably a microprocessor. Again, it may take any form consistent with the operating parameters and circuit design or programming criteria applicable to any particular system. Purely for illustration, one possible embodiment of read-write control 72 is shown in FIG. 11. Together with memory 74, it forms the control means which selectively route various channels to and from appropriate subscriber buffers 80.

The program of the read-write control 72 may begin with the occurrence of the "start incoming channel 1" pulse generated by framing generator 62 and supplied to read-write control 72. Following an 8-bit delay during which the incoming information on channel 1 is serially loaded into shift register 54, the program momentarily enables the LOAD inputs of registers 64, 68 and command decoder 66, thus causing the appropriate information to be loaded into the output register 68 from which it can thereupon be read out. For this purpose, the program enables the DIVERT lead which operates gates 58 and 74, as well as the READ OUT lead of shift register 68, for an 8-bit interval. This causes the contents of shift register 68 to be serially clocked out into the outgoing T1 line at 56.

Simultaneously with the enabling of the DIVERT and READ OUT leads (which occurs at the simultaneous beginning of input channel 2 and output channel 1, as illustrated in FIG. 4) the program sets an internal channel counter register to n=2. The program then proceeds to interrogate the memory 74 to determine whether channel n has been assigned for a communication under the control of command decoder 66. If channel n has not been assigned, the program waits for eight bits until the start of the next channel, then increments the internal channel counting register by one and repeats the memory interrogation cycle for the next channel. At the end of channel 24, the program, instead of repeating the memory interrogation cycle, returns to the starting point for the next frame.

If the memory reports that channel n has been assigned, the read-write control program first determines whether the channel has been assigned to S-bit processing. If it has not, it follows that the channel must have been assigned to a subscriber, and the program thereupon determines the identity of the subscriber involved from the information stored in memory 74. In addition, be testing the ring bit status supplied by the memory, the program determines whether the subscriber needs to be rung. If so, the program enables the RING output of read-write control 72 for an 8-bit period so as to set the ring bit in the subscriber buffer 80. Otherwise, the program goes directly to the momentary enabling of the appropriate L output connected to the buffer 80 of the subscriber involved for a 16-bit period.

During the first eight bits of this 16 bit period, the subscriber buffer 80 will receive an incoming signal as hereinafter described, and during the next eight bits it will send out an outgoing signal. The program therefore waits for eight bits and then enables the DIVERT lead for an eight-bit period to produce a read-out of the outgoing signal into the outgoing T1 line.

The program then returns to the memory interrogation loop to check the next channel.

In the described system, channel 24 may advantageously be permanently assigned for the transmission, in a listen-only mode (i.e. to but not from the subscriber), of certain general-interest information such as, e.g., stock market reports. In that case, the program, when it reaches n=24, does not check for assignment status but instead examines a special register in memory 74 which contains the identities of all subscribers which have requested connection to that channel. The program then simultaneously enables the L outputs of all requesting subscribers for eight bits (DIVERT and the second eight-bit period are not used because the subscribers can only listen on that channel, and the subscribers' return bursts must be prevented from being substituted for the incoming channel information).

If the memory 74 indicates that the channel under consideration has been assigned to S-bit processing, the program starts the S-bit sequencer and then returns to the memory interrogation loop.

The S-bit sequencer may be a separate program started by the sequencer start pulse produced by the main program. If first produces a delay of y frames, y being two times the number of the distribution location. The reason for this is that S-bits appear on the S-bit transmission channel at the rate of one eight-bit binary word per frame, each bit relating to a specific subscriber. It therefore takes two frames to transmit all fourteen S-bits pertaining to a given distribution location. Consequently, the S-bits pertaining to distribution location No. 7 would not be transmitted until the thirteenth and fourteenth frames following the initiation of a "process S-bits" command. Following the expiration of the delay, the S-bit sequence program enables the $S_{inA}$ lead of the read-write control 72 for eight bits and the $S_{outA}$ and DIVERT leads for the next eight bits. It then waits one frame interval less eight bits and enables $S_{inB}$ for eight bits, followed by the enabling of $S_{outB}$ and DIVERT for eight bits. The sequencing program then returns to its beginning and awaits the next start pulse from the main program.

In order to prevent the subscriber's telephone from ringing when he hangs up at the end of a conversation, the off-hook bits H1 and H14 from the various subscribers are applied to the memory 74 in such a manner as to delete, when the corresponding subscriber goes off hook, any ring bit placed in the memory by command decoder 66 when decoding a "connect" command. In the same manner, ringing is prevented during a subscriber-originated call, as the subscriber is already off-hook when the "connect" command is received on such a call.

FIG. 9 illustrates in detail the functional relationships of one possible form of subscriber buffer 80. The incoming signal from the T1 line is applied via the input bus 81

(see also FIG. 8) to the serial input of an 8-bit shift register 82. The outgoing signal is serially applied to the outgoing T1 line from the output of shift register 84 via the output bus 85 (see also Fig.).

The leading edge of the L lead enabling signal coming from read-write control 72 starts a timer 86. The timer 86 counts eight bits under the control of its clock input and then momentarily enables the LOAD leads of input buffer register 88, shift register 84, S-bit register 96, and H-bit register 98. The enabling of these LOAD inputs transfers the incoming information now stored in shift register 82 into input buffer 88, and likewise stores the outgoing information from output buffer register 90 in the shift register 84 for transmission. It also stores the outgoing S-bit and H-bit information for use by the other circuits described herein.

Simultaneously with the momentary enabling of the LOAD leads, the timer 86 enables the READ OUT lead of shift register 84 for eight bits to transmit the outgoing signal, and applies a momentary trigger pulse to the burst clock 92. The burst clock 92 enables the READ OUT lead of input buffer register 88 for eleven burst clock bits (which are longer than T1 bits). Simultaneously, the burst clock pulses cause the input buffer register 88 to be serially read out into the transmitter portion of transceiver 94. The transceiver 94 thereupon transmits to the subscriber a signal burst of the format shown in FIG. 3 in which the start bit, S-bit, and ring bit are supplied by input buffer register 88 and the balance bit is provided in a known manner by transceiver 94. The function of the balance bit is to produce an even number of ones in each outgoing burst to keep the outgoing line electrically balanced.

The incoming signal from the subscriber is received by the receiver portion of transceiver 94 which derives receive clock information in the usual way from the incoming burst and uses this clock to serially store the incoming burst in output buffer register 90. The $S_{out}$ and H information stored in output buffer register 90 is loaded into S-bit register 96 and H bit register 98, respectively, under the control of the LOAD pulse from timer 86, for transmission to $S_{out}$ buffer register 76, off-hook buffer 70 and memory 74.

FIG. 7 shows the details of the operating section 12 of the central office 10. The T1 line terminates in a conventional termination unit 100 which amplifies and equalizes the T1 signals and converts the bipolar pulse format of the T1 line to a unipolar format for switching purposes. Channel 1 is next picked off by a conventional pick-off circuit 101 for purposes hereafter described, and the unipolar digital signal is then applied to a digital switching matrix or time slot interchange circuit 102. The matrix 102 switches the various channels of the T1 line to appropriate channels of other T1 lines leading to the outside world. The switching is accomplished under the control of a switching controller 104 which forms part of the central office's central computer 105. The memory 106 receives outside world connection request information from central computer 105, subscriber service request information from service request decoder 114, and switching status information from the switching controller 104. The matrix 102, switching controller 104, and memory 106 together form the switching means which control the operation of the system.

The central office computer 105 may be of any conventional type used in all-digital central offices. Its particular design forms no part of this invention, as long as it has the capability of determining which subscribers are to be connected to which outside world line, and which subscribers are to be connected to the dedicated general-interest channel 24.

To the extent that the internal operation of the switching controller 104 is material to the functioning of this invention, it preferably takes the form of program means such as a programmed microprocessor or computer. Although the particular form of this program, and of the hardware which implements it, may vary widely to accommodate the design and programming requirements of a particular manufacturer, one possible program is outlined as a matter of example in FIG. 12. Turning to that figure, it will be seen that the main program of controller 104 begins with the setting of an internal subscriber counter register m to 1. The program then interrogates the memory 106 to determine the status of subscriber number 1. If the subscriber is off-hook at the central office (a fact which is entered into the memory 106 through the continual updating of memory 106 by the central office computer 105), the program next determines whether a channel has been assigned to that subscriber.

If a channel has been assigned, the program assumes that a conversation is in progress and proceeds without action, through an interruption sequence subsequently discussed hereinafter, to the incrementing of m and to the return point of the memory interrogation loop.

If no channel has been assigned, the program recognizes a situation in which a connection has to be established. It consequently interrogates the memory to see if a channel is available. If no channel is available, the connection cannot be made and the program returns to the interrogation loop. If a channel is available, however, the program enters into the memory the assignment of the next available channel and then triggers the command generator 110 to generate and send out an appropriate command to produce the connection of the subscriber line involved to the assigned channel at its "smart repeater" 22. At the same time, the program issues a timer start pulse T to start a comparator timer (which may be a physical component, not shown, in the comparator 112, or a subroutine of the program). The program then halts pending receipt of the ACKNOWLEDGED pulse described below from the comparator 112.

Simultaneously with the transmission of the appropriate command over the T1 line, the command generator 110 also transfers the generated command to the comparator 112. The comparator 112 examines the incoming signal from the T1 line on channel 1 and continuously compares it to at least the first word of the stored generated command. As soon as the comparator 112 sees a correct return of the transmitted first word or words, it issues an ACKNOWLEDGED pulse to the controller 104, and the program returns to the memory interrogation loop.

If, after a time interval sufficient for the transmitted command to have returned to the central office 10 (keeping in mind the length of the T1 line and the one-channel delays in each "smart repeater"), no correct comparison has been found, the comparator timer times out. The comparator 112 thereupon assumes that the command has been lost and triggers command generator 110 to retransmit the pending command.

If the program determines that the line $L_m$ is on-hook at the central office, it next tests to see if the line is off-hook at the subscriber location. This information is also contained in the memory 106, where the off-hook bits decoded by service request decoder 114 from the latest "return service requests" command are stored. If the subscriber is found to be off-hook, the program next checks if a channel has been assigned to line $L_m$. If it has, a connection with the central office is in the process of being established, and no further action is needed. The program therefore returns to the memory interrogation loop.

If no channel has been assigned, the program proceeds to the connection-establishing sequence previously described.

If the program finds that both ends of line $L_m$ are on-hook, it checks to see if a channel has been assigned to line $L_m$. If none has, no action is needed and the program returns to the memory interruption loop. If a channel is still assigned to line $L_m$, however, the program resets output y for a purpose hereinafter described and triggers the op code generator 110 to issue a "disconnect" command for line $L_m$.

When the memory has been checked for the connection and off-hook status of all 197 subscriber lines (196 actual subscriber lines plus the S-bit "line"), the program resets m to 1 and starts over.

Every so often the controller 104 must check for pending subscriber service requests and, at greater intervals, must transmit S-bits to and from the distribution locations. The interrupt sequence indicated in the memory interrogation loop in FIG. 12 accomplishes this purpose.

Whenever the program goes through the return portion of the memory interrogation loop it tests for the presence of an S-bit interrupt. This interrupt is generated by a timer 116 which produces an interrupt signal whenever it times out and until it is reset. This interrupt signal can be disabled by setting the input z of a switch 118. If the test shows that no interrupt is present, the program continues unhindered through the memory interrogation loop. If an interrupt is present, however, the program proceeds to interrogate the memory to see if a channel is available for the transmission of the S-bits. If no channel is available, the program produces a pulse which sets the z input of switch 118 and then returns to the main memory interrogation loop. As long as z is set, no S-bit transmission can take place. As soon as a channel has become available, however, through a "disconnect" command in the main loop, the main loop issues a reset pulse to reset z, and the S-bit interrupt immediately goes into effect.

If a channel is available for the S-bit interrupt, the program assigns that channel to the S-bit transmission by appropriately operating the switching matrix 102, and records that fact in the memory 106. It then issues a reset pulse to reset timer 116, so that timer 116 will produce the next S-bit interrupt in due course. The program then triggers the command generator 110 to produce a "process S-bits" command. When the acknowledgement of this command has been received by the central office 10, the program starts a timer 115 by way of a pulse D which holds the off-hook condition created by the program on the selected channel for twenty-eight frames, the time required to transmit all the S-bits to and from the fourteen repeaters of the system. After starting the timer 115, the program immediately returns to the main memory interrogation loop.

Following the test for an S-bit interrupt, the main program goes through a similar test for a service request interrupt. That interrupt is also triggered by a timer 117 which causes an interrupt to take place when it times out. If a service request interrupt is indicated, the program triggers the command generator 110 to issue a "return service requests" command to "smart repeater" No. k. After receiving acknowledgement of the command, the program increments k by 1, resets the service request interrupt timer 117, and returns to the main memory interrogation loop.

Concurrently with the transmission of "return service requests" command, the program informs the service request decoder 114 (FIG. 7) of the identity of the "smart repeater" being interrogated, so as to enable the decoder 114 to properly interpret the identity of the subscribers which are off-hook when the modified command containing the service requests (i.e. the identities of the subscribers which are off-hook) is received by the central office 10.

It will be understood that timers 115, 116, 117 and switch 118 may in practice be subroutines programmed into the microprocessor or computer of switching controller 104 in accordance with well-known programming techniques.

The specific design of command generator 110 and service request decoder 114 may vary in accordance with the preferences of any particular logic designer or programmer, and is not material to the invention. Suffice it to say that the command generator 110 preferably consists of one or more shift registers whose bits are loaded under the control of the switching controller 104 and memory 106 and are serially read into channel 1 of the T1 line in successive frames under the control of the internal clocking and framing signals of the central office 10.

As for the service request decoder 114, it functions in a manner similar to the command decoder 66 of FIG. 8, except that it responds only to "return service requests" commands, and responds only by loading into the memory 106 the identity of the subscribers who show an off-hook condition in the returned command.

Upon issuance of a "process S-bits" command, the switching controller 104, upon receipt of the acknowledgement, enables the READ and WRITE leads to the S-bit register 116 and the S-bit interface 118, respectively. The S-bit interface 118 receives S-bit information serially from the outgoing S-bit register 120 under the control of the WRITE signal for conversion into D3 format, whereas the incoming S-bit register 116 serially receives S-bit information converted from D3 format by the S-bit interface 118 under the control of the READ signal.

The S-bit registers 116 and 120 are storage registers for storing the incoming and outgoing S-bits, respectively, of all the subscribers of the system for utilization in, or issuance by, appropriate outside-world devices (not shown).

We claim:
1. A telephone system for conveying digital signals between a central office and a plurality of subscriber locations, comprising;
   (a) at least one distribution location remote from said central office; each said distribution location being connected to at least one of said subscriber locations by two wire line means;
   (b) time-division pulse-code multiplexed digital signal carrier means serially connecting said central office and said distribution locations and being looped back to said central office, said carrier means having a plurality of signal channels transmitted se- quentially, said channels occupying equal time intervals in said time division;

(c) switching means at said central office for selectively connecting said channels of said carrier means at said central office to the outside world or to each other;

(d) subscriber-connecting means at said distribution locations for selectively connecting individual ones of said subscriber locations to individual channels of said carrier means under the control of said switching means.

2. The system of claim 1, in which said subscriber-connecting means include control means operated by signals transmitted from said switching means over said carrier means for selectively converting incoming PCM information in a selected channel of said carrier means into PCM bursts for transmission to a selected subscriber location over said subscriber location's two-wire line, converting PCM bursts received from said subscriber location over said two-wire line into outgoing PCM information in said selected channel, and substituting said outgoing PCM information for said incoming PCM information in said selected channel.

3. The system of claim 2, in which said subscriber-connecting means is essentially transparent to PCM information in non-selected channels of said carrier means.

4. The system of claim 3, in which all channels of said carrier means, whether or not selected, are delayed by equal amounts of time in said subscriber-connecting means.

5. The system of claim 4, in which said delay is one channel interval.

6. The system of claim 1, in which said subscriber-connecting means further comprise means for permitting one or more selected subscriber locations to be connected to a single selected channel of said carrier means in a listen-only mode.

7. The system of claim 6, further comprising means for applying PCM information on said single selected channel directly to said carrier means at the output of said subscriber-connecting means after a predetermined delay; means for converting said incoming PCM information into PCM bursts for transmission to each of said selected subscriber locations; and means for preventing the PCM bursts received from said selected subscriber locations from being transmitted over said carrier means.

8. The system of claim 1, further comprising slow-speed signal transmission means including:
(i) storage means at said central office and at said distribution location for storing a plurality of said slow-speed signals each relating to a specific subscriber;
(ii) S-bit transmission means associated with said switching means for intermittently transmitting said slow-speed signals between said storage means over a selected channel of said carrier means; and
(iii) S-bit coding means associated with said subscriber-connecting means and arranged to encode or decode said slow-speed signals stored at said distribution location onto or from PCM information bursts transmitted between said distribution location and said subscriber locations.

9. The system of claim 8, in which said slow-speed signal transmission means transmit signals in both directions between said central office and said subscriber locations.

10. The system of claim 9, in which:
(a) slow-speed signals being transmitted by said central office are encoded onto said selected channel of said carrier means in the form of first binary words, each of said first words containing S-bit information relating to a plurality of subscribers;
(b) selected ones of said first words are stored at selected distribution locations, selected bits thereof being encoded upon PCM bursts going to selected subscriber locations;
(c) slow-speed signal bits transmitted by said subscriber locations are assembled at said distribution locations into second binary words, each bit position in said second words being associated with a specific predetermined subscriber location;
(d) said second words are substituted in said selected channel at their distribution location for the first words selected for storage at that distribution location; and
(e) first words not selected for storage at that distribution location are transmitted unchanged through that distribution location.

11. The system of claim 1, in which said switching means controls said subscriber-connecting means by transmitting commands from said central office over a dedicated channel of said carrier means.

12. The system of claim 11, in which said commands consist of sequences of binary words transmitted in successive frames of said carrier means, the first word of each sequence containing a unique code identifying that word as a first word and defining the nature of the operation to be performed at a distribution location in response to that command.

13. The system of claim 12, in which said central office includes comparison means operatively connected to both ends of said carrier means and arranged to cause retransmission of transmitted commands after a predetermined time interval unless said first word of said command is correctly received by said comparison means from said carrier means within said predetermined time interval.

14. The system of claim 13, further comprising means for inhibiting the transmission of commands until at least the first word of the preceding command has been correctly received by said comparison means.

15. The system of claim 1, further comprising:
(d) means at said subscriber locations arranged to periodically transmit PCM bursts to the distribution location associated therewith, said bursts including an off-hook bit representative of the off-hook status of the subscriber at that subscriber location;
(e) off-hook status storage means at said distribution locations arranged to store off-hook information regarding the subscribers connected thereto in response to said off-hook bits;
(f) command transmitting means at said central office arranged to periodically transmit to said distribution locations and back to said central office commands including binary words having predetermined bit positions assigned to specific subscribers;
(g) means at said distribution locations arranged to set the bit values of the bit positions corresponding to the subscribers connected thereto in accordance with the subscriber's off-hook information; and
(h) decoding means at said central office arranged to decode the subscriber's off-hook information from the bit values set in the corresponding positions of said command as returned to said central office, and to convey said off-hook information to said switching means.

16. The system of claim 1, in which said switching means include programmed microprocessor means.

17. The system of claim 16, in which said microprocessor means include main program means arranged to continually detect the need for, and to execute, subscriber connection and disconnection operations; means to periodically interrupt said main program to transmit slow-speed signal information over an available channel of said carrier means; and means operative if no channel is available at the time of said interrupt to seize the first channel which becomes available and to perform said slow-speed signal transmission immediately upon such seizure.

18. A method of digitally transmitting information between a central office and a plurality of subscriber locations scattered along a PCM multi-channel multiplexed telephone carrier having a plurality of distribution locations spaced therealong, said method comprising the steps of:
  (a) generating, at said central office, commands representing connections to be made or broken between selected subscriber locations and selected channels of said carrier at selected distribution locations;
  (b) transmitting said commands to said distribution locations and transmitting information thereto in said selected channels;
  (c) converting, at said distribution locations, the information contained in said selected channels and coming from said central office into PCM bursts under the control of said commands; and
  (d) transmitting said PCM bursts to said subscriber locations.

19. The method of claim 18, further comprising the steps of:
  (e) transmitting PCM bursts of subscriber-originated information from said subscriber locations to said distribution locations;
  (f) converting, at said distribution locations, PCM bursts received from said subscriber locations into carrier channel information; and
  (g) substituting, at said distribution locations, the channel information converted from said PCM bursts for the channel information coming from said central office, in at least some of said selected channels, under the control of said commands.

20. The method of claim 19 further comprising the steps of:
  (h) periodically transmitting service request commands from said central office to said distribution locations and back to said central office; and
  (i) modifying, at said distribution locations, said service request commands to indicate to said central office the off-hook status of said subscriber locations.

* * * * *